United States Patent [19]
Matsuoka et al.

[11] Patent Number: 6,074,796
[45] Date of Patent: Jun. 13, 2000

[54] PROCESS FOR PRODUCING BINDER RESIN FOR TONER

[75] Inventors: Sonoo Matsuoka; Kaoru Kajino; Takashi Terabayashi, all of Tochigi-ken; Hiroshi Serizawa, Saitama-ken, all of Japan

[73] Assignee: Nippon Carbide Kogyo Kabushiki Kaisha, Tokyo, Japan

[21] Appl. No.: 08/909,832

[22] Filed: Aug. 12, 1997

[30] Foreign Application Priority Data

Aug. 30, 1996 [JP] Japan ................................. 8-246823
Mar. 28, 1997 [JP] Japan ................................. 9-076837

[51] Int. Cl.⁷ .............................. G03C 5/00; C08L 25/04
[52] U.S. Cl. ......................... 430/137; 430/138; 525/197; 525/198; 525/241
[58] Field of Search ................... 430/138, 137; 525/197, 198, 241

[56] References Cited

U.S. PATENT DOCUMENTS

| | | | |
|---|---|---|---|
| 3,742,093 | 6/1973 | Skidmore . | |
| 4,443,591 | 4/1984 | Schmidt et al. | 528/128 |
| 4,473,628 | 9/1984 | Kasuya et al. . | |
| 4,636,451 | 1/1987 | Matkin et al. | 430/109 |
| 4,708,986 | 11/1987 | Gerth et al. | 525/177 |
| 4,837,107 | 6/1989 | Axelsson et al. | 430/138 |
| 4,968,576 | 11/1990 | Maruta et al. | 430/110 |
| 5,084,368 | 1/1992 | Hirayama et al. . | |
| 5,130,220 | 7/1992 | Nakamura et al. . | |
| 5,317,060 | 5/1994 | Kukimoto et al. . | |
| 5,518,848 | 5/1996 | Ito et al. . | |
| 5,547,794 | 8/1996 | Demizu et al. | 430/106 |
| 5,962,176 | 10/1999 | Ohno et al. | 430/110 |
| 5,972,553 | 10/1999 | Katada et al. | 430/110 |

FOREIGN PATENT DOCUMENTS

| | | |
|---|---|---|
| 0 351 456 | 1/1990 | European Pat. Off. . |
| 2-48657 | 2/1990 | Japan . |
| 4-198941 | 7/1992 | Japan . |

OTHER PUBLICATIONS

Mita Ind. Co. Ltd., Derwent Abstract 92–289309, Abstracting JP 900332841.

*Primary Examiner*—Jeffrey C. Mullis
*Attorney, Agent, or Firm*—Young & Thompson

[57] ABSTRACT

A process for producing a binder resin for a toner comprising the steps of (1) mixing a substantially solventless resin (A) and an emulsion of a resin (B) different from resin (A) with stirring and (2) evaporating water from the mixture of resin (A) and the emulsion of resin (B) simultaneously with or after the step (1) to obtain a substantially solventless resin composition.

11 Claims, 1 Drawing Sheet

PROCESS FOR PRODUCING BINDER RESIN FOR TONER

BACKGROUND OF THE INVENTION

1. Field of the Invention

The present invention relates to a process for producing a binder resin for a toner which comprises a plurality of resins.

2. Description of Related Art

A variety of polymers have been developed and made use of in various fields as, for example, base materials, coating materials, binders, etc. The polymers can be used individually for the respective purposes but, in many cases, where desired characteristics cannot be sufficiently obtained from a single polymer, they have been used as a mixture of two or more thereof to compensate for the insufficiency.

For example, many binders for a toner for developing an electrostatic latent image comprise a mixture of a high-molecular weight polymer and a low-molecular weight polymer because they are required to have various characteristics. Such binders involve the following problems.

A toner for developing an electrostatic latent image is generally made up of a resinous component, a colorant (a pigment or a dye), and additives, such as a parting agent and a charge control agent. The resinous component includes natural or synthetic resins used either individually or as an appropriate mixture thereof. Many improvements have been proposed on the resinous component of a toner suited to a dry development system, which has recently undergone rapid technological development. In particular, a fusing roller system has been adopted in an electrophtographic copying machine aiming at high-speed copying and low-temperature energy-saving copying. According to this fixing system, a toner image formed on an electrostatic recording medium called a photoreceptor is transferred to a transfer sheet, such as paper, and the sheet is passed through fusing rollers for hot pressing thereby to fuse and fix the toner image onto the sheet.

Various methods for embodying a fixing system are known. A contact heat fixing system typically including a system using a fusing roller unit is superior in thermal efficiency to a non-contact heat fixing system using, e.g., a hot plate fixing unit, and is preferred particularly for feasibility of fixing at a high speed and a low temperature.

However, if the contact heat fixing system is applied to conventional toner, the toner coming into contact in a molten state with the fusing roller is transferred onto the fusing roller and stains the next transfer sheet (called an offset phenomenon).

On the other hand, copying machines have ever been increasing the speed, and it naturally follows that the contact time with a fusing roller becomes shorter. Therefore, a toner that fuses in a short heating time has been demanded. Further, from the standpoint of energy saving and safety, a toner that fuses at as low a temperature as possible and shows satisfactory fluidity on fusing has been sought.

In order to securely accomplish fixing at a fixing temperature, it is accepted preferable that the toner for this fixing system contains a binder resin comprising a low-molecular weight polymer so as to decrease the viscosity and also a high-molecular weight polymer so as to increase the modulus of elasticity and to prevent the offset phenomenon (sticking of part of the toner to a contact fusing roller).

Styrene resins are often used as such a binder resin for a toner which comprises a low-molecular weight polymer and a high-molecular weight polymer, and various methods of polymerization have been studied.

For example, Japanese Patent Laid-Open No. 48657/90 discloses a method in which a high-molecular weight polymer is produced by suspension polymerization using a polyfunctional initiator, and a low-molecular weight polymer is then produced in the presence of the high-molecular weight polymer. The resulting polymer is dried to provide a solvent-free polymer mixture comprising a high-molecular weight polymer and a low-molecular weight polymer, which is expected to be applicable as a binder resin for a toner.

In general, it is relatively easy to obtain a high-molecular weight polymer by suspension polymerization using a crosslinking agent, such as divinylbenzene, diethylene glycol dimethacrylate, and trimethylolpropane dimethacrylate. However, in order to obtain a low-molecular weight polymer by suspension polymerization, it is necessary to use a large quantity of a chain transfer agent, such as mercaptans or halogen compounds, or a large quantity of a polymerization initiator. In using a chain transfer agent, the polymer must be subjected to post-treatment to remove an undesired odor or a residual halogen compound, which increases the cost. Further, the method involves difficulty in removing unreacted polymerizable monomers.

Japanese Patent Laid-Open No. 48657/90 discloses a technique comprising dissolving a low-molecular weight polymer obtained by solution polymerization in a polymerizable monomer which is to provide a high-molecular weight polymer and causing the system to polymerize by addition of a polyfunctional initiator (having at least trifunctionality) to prepare a binder resin for a toner. However, a solution polymerization system for producing a high-molecular weight resin produces the Weissenberg effect (a phenomenon that a resin rises, clinging to a stirring rod), which makes the production difficult.

U.S. Pat. No. 5,084,368 teaches combining solution polymerization with bulk polymerization for production of a high-molecular weight polymer.

Any of these processes based on solution polymerization requires a step of solvent removal for obtaining a solventless resin mixture, which not only needs labor but incurs cost.

Additionally, since solution polymerization has a difficulty in producing polymers having a high weight average molecular weight of more than 200,000, the resulting polymers have not sufficient molecular weight enough to overcome the problem of offset.

SUMMARY OF THE INVENTION

An object of the present invention is to provide a process for producing a binder resin for a toner in which a low-molecular weight polymer and a high-molecular weight polymer are uniformly dispersed, the binder resin being capable of providing a toner for developing an electrostatic latent image which has reduced odor and exhibits satisfactory characteristics, such as anti-offset properties, fixing properties, grindability in the production thereof, antiblocking properties (resistance to agglomeration) during storage, and developing properties in toner image formation.

As a result of extensive study, the inventors of the present invention have found that a substantially solventless resin composition obtained by mixing a substantially solventless resin and an emulsion of another resin with stirring and removing the water content from the mixture by evaporation serves as an excellent binder resin for a toner, achieving the above object of the present invention. The present invention has been completed based on this finding.

The present invention provides a process for producing a binder resin for a toner comprising the steps of (1) mixing (A) a substantially solventless resin (hereinafter referred to as resin (A)) and an emulsion of (B) a resin different from the resin (A) (hereinafter referred to as resin (B)) with stirring and (2) removing water from the mixture of resin (A) and emulsion of resin (B) by evaporation simultaneously with or after the step (1) to obtain a substantially solventless resin composition.

According to the present invention, a substantially solventless and uniformly mixed resin composition useful as a binder resin for a toner can be produced efficiently and economically from a substantially solventless resin (A) and an emulsion of resin (B) different from resin (A).

Unreacted monomers remaining in resin (A) and the emulsion of resin (B) can effectively be driven out of the system, accompanying evaporated water, to a very low concentration to provide a binder resin for a toner with almost imperceptible odor.

A toner for electrostatic latent image development which uses, as a binder resin, the resin composition obtained by the process of the present invention which comprises a low-molecular weight resin and a high-molecular weight resin exhibits pronouncedly excellent characteristics. That is, (a) the low-molecular weight resin and the high-molecular weight resin are uniformly dispersed in the toner; (b) the toner is satisfactory in anti-offset properties, fixing properties, grindability in the production, antiblocking properties (resistance to agglomeration) during storage, and developing properties in image formation; and (c) the toner gives off little odor.

The process for producing a binder resin for a toner according to the present invention aims to obtain a substantially solventless and uniform binder resin for a toner, comprising the steps of (1) mixing a substantially solventless resin (resin (A)) and an emulsion of another resin (resin (B)) with stirring at a temperature at or above the glass transition point of resin (A), (2) removing water by evaporation, and, if desired, (3) kneading.

The process of the present invention provides a binder resin for a toner in which a low-molecular weight polymer and a high-molecular weight polymer are uniformly dispersed. Use of the resulting binder resin provides a toner for electrostatic latent image development which has satisfactory characteristics, such as anti-offset properties, fixing properties, grindability in the production, antiblocking properties (resistance to agglomeration) during storage, and developing properties in image formation, and has little odor.

DETAILED DESCRIPTION OF THE INVENTION

The process for producing a binder resin for a toner according to the present invention will be described below in detail.

The process for producing a binder resin for a toner according to the present invention which comprises a substantially solventless resin composition is characterized by, as mentioned above, comprising the steps of (1) mixing a substantially solventless resin (A) and an emulsion of resin (B) different from resin (A) with stirring and (2) removing water from the mixture of resin (A) and the emulsion of resin (B) by evaporation either simultaneously with or after the mixing step (1).

The language "resin B is different from resin A" as used herein has a broad meaning covering all the embodiments that the two resins have any difference in their polymeric chains, such as a difference in constituent unit, molecular weight, molecular weight distribution, end group, and the like.

The step of (1) mixing with stirring is a step of mixing substantially solventless resin (A) and an emulsion of resin (B) by stirring mechanically or any other means.

The step (1) is preferably carried out at or above the glass transition point of resin (A), particularly at or above a temperature higher than the glass transition point by at least 20° C. The mixture of resin (A) and resin (B) finally obtained under this preferred temperature condition has a uniform composition and provides a toner with improved physical properties.

During the step (1), the resin particles of the emulsion of resin (B) come into contact with resin (A) and united therewith while being in a dispersed state. This mechanism of action seems to be accelerated under the preferred temperature condition to bring about the above-described advantage of the step (1).

The step (1) may be performed either under atmospheric pressure or under pressure so as to suppress evaporation of the water content.

The step (2) is a step of removing water from the mixture of resin (A), resin (B), and water as obtained by the step (1). The step (2) provides a mixed resin composition from which most of the water content has been removed. Where the composition from the step (1) contains volatile impurities such as residual monomers and an organic solvent, such impurities can be removed concomitantly by the step (2).

The step (2) can be carried out by heating the mixture at or above the boiling point of water present in the mixture and, more effectively, under reduced pressure. When the step (2) is conducted under atmospheric pressure, the heating temperature may be around 100° C. in the initial stage of mixing resin (A) and the emulsion of resin (B) but should be increased as the removal of water proceeds to decrease the water content of the mixture.

The step (2) may be performed either after completion of the step (1) or simultaneously with the step (1). The latter mode is preferred for efficiency.

On starting the step (2), the water content of the mixture begins to decrease to remove most of the water at last. Where the step (2) is carried out simultaneously with the step (1), evaporation of water from the mixture and reduction in water start on starting the step (1).

Where it is desired for the resulting mixture of resin (A) and resin (B) to have a highly uniform composition, the steps (1) and (2) are preferably followed by (3) a step of kneading.

The term "kneading" as used herein means mechanically kneading the mixed resin composition from which most of water has been removed.

In this case, the kneading may be carried out under such a condition that causes a small amount of residual water to be removed.

It is preferable for securing further improved uniformity of the composition that the step (3) be carried out with at least one of resin (A) and resin (B) being in a molten state.

The steps (1) and (2) and, if desired, the step (3) can be practiced by, for example, a method of using an apparatus having a heating function, a mixing function, and a function of removing water through evaporation.

Preferred apparatus having these functions include a pressure kneader, a Banbury mixer, a roll mill, and a single- or twin-screw continuous mixer.

A twin-screw continuous mixer is advantageous in that the mixing step (1), the water removing step (2), and the kneading step (3) for making the dispersion of resins (A) and (B) more uniform can be performed in a single apparatus efficiently.

While various twin-screw continuous mixers are available, those having two self-cleaning type shafts having fixed thereto a plurality of paddles or two self-cleaning type screws, particularly those in which paddles of each shaft rotate in contact with the inner wall of the barrel of the mixer while the paddles of one shaft come into contact with those of the other, are still preferred for their high mixing effect and satisfactory workability. These twin-screw continuous mixers are preferably capable of delivering a fluid having a viscosity of 10 to $1 \times 10^8$ cps from the feed opening to the discharge end through revolution of paddles or screws.

Twin-screw continuous mixers of this type are known and commercially available, e.g., under a trade name of "KRC Kneader" manufactured by Kurimoto, Ltd.

By use of the above-described apparatus, the steps (1) and (3) can be practiced by mixing the mixture with stirring through revolution of the screws or paddles fixed to the stirring shafts, and the step (2) can be efficiently carried out by heating the mixture to a temperature not lower than the equilibrium evaporation temperature of water present in the mixture by means of a heating jacket or an electric heater usually set on the apparatus or by heating under reduced pressure. Alternatively, the step (2) can be conducted by well-known flash distillation, in which the mixture is, if desired as heated, introduced into a reduced pressure zone to evaporate water to make the mixture into a substantially solventless state.

The steps (1) and (2) can be performed in the same apparatus or separate apparatus, preferably in the same apparatus.

Where the step (3) is conducted, the steps (1), (2) and (3) can be carried out in the respective apparatus; or the steps (1) and (2) can be carried out in the same apparatus (first apparatus) and the step (3) in a separate apparatus (second apparatus); or the step (1) in the first apparatus and the steps (2) and (3) in a separate apparatus (second apparatus); or all the steps (1) through (3) in a single apparatus. Where a particularly uniform mixed resin composition is desired, it is preferable to carry out the steps (1) and (2) in a first apparatus and the step (3) in a second apparatus. Where weight is put on satisfactory workability, it is preferable to carry out all the steps (1) through (3) in a single apparatus.

In carrying out the steps (1) and (2) in a first apparatus and the step (3) in a second apparatus, it is preferable for the mixed resin composition discharged from the discharge end of the first apparatus to have a water content of not more than 20% by weight, particularly not more than 5% by weight.

Figure 1:
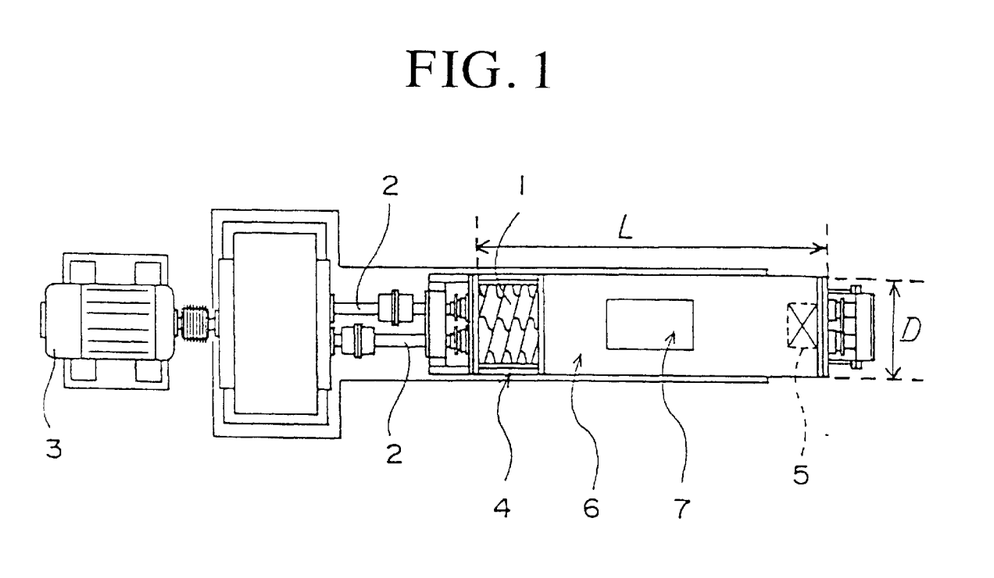
FIG. 1 is a schematic plan view of a twin-screw continuous mixer which is used for preference to carry out the steps (1) and (2) and, if desired, the step (3) of the present invention.
Figure 2:
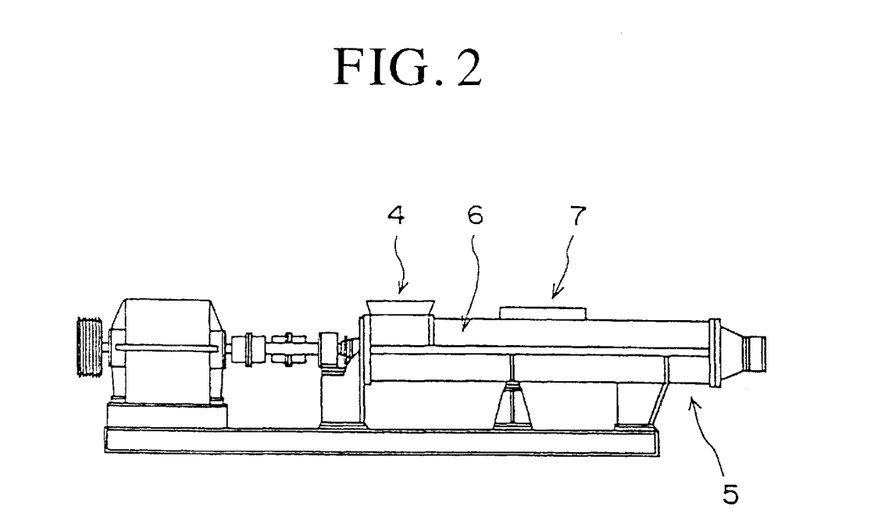
FIG. 2 is a schematic side view of the twin-screw continuous mixer of FIG. 1.

FIGS. 1 and 2 schematically illustrate the structure of a preferred twin-screw continuous mixer. FIG. 1 provides a schematic plan view, and FIG. 2 a schematic side view. Embodiments for carrying out the steps (1) and (2) simultaneously followed by the step (3) by the use of the twin-screw continuous mixer will be explained by referring to FIGS. 1 and 2.

The twin-screw continuous mixer used here has two shafts 2 each having fixed thereto a number of paddles 1. The shafts 2 are revolved by a motor 3, whereby a slurry of resin (A) and an emulsion of resin (B) which is continuously fed through a feed opening 4 is stirred and mixed at a temperature not lower than the glass transition point of resin (A) and forwarded toward a discharge end 5.

Meanwhile, the mixture is heated by means of a heating jacket 6 through which a heating medium, such as steam or oil, is circulated or an electric heater (not shown) to discharge water of the emulsion from a vent hole 7. The feed rate of the slurry of resin (A) and the emulsion of resin (B) is usually adjusted by a means (not shown) so as to leave space between the upper surface of the moving resin and the heating jacket so that the evaporated water may pass through the space and discharged from the vent hole 7. While the temperature of the mixture in the vicinity of the feed opening 4 is 100 to 110° C. because of a high water content, it gradually increases as the water content decreases. Finally the most of the water content of the mixture is removed. Thereafter, the kneading step (3) is conducted preferably at a temperature at which resin (A) melts. Through the step (3) resin (A) and resin (B) are dispersed more uniformly. In the melt zone where the step (3) is effected, residual water of the melt is also evaporated and discharged from the vent hole 7.

Depending on the end use, the resin obtained from the discharge end 5 can be continuously transferred to another apparatus where it is processed into pellets or flakes.

In the case where the steps (1), (2), and (3) are performed by means of the above-illustrated twin-screw continuous mixer, such conditions as the heating temperature of the jacket and the retention time for each step vary depending on the kinds of resin (A) and the emulsion of resin (B), the water content of the emulsion of resin (B), a desired degree of dispersion of resin (A) and resin (B) or a desired content of residual water in the mixed resin composition obtained from the discharge end 5, the throughput capacity of the apparatus, and other factors. Nevertheless it is easy for one skilled in the art to decide these conditions theoretically and experimentally provided that the above-mentioned factors are once specified.

In general, the time and the length of the zone necessary for achieving the steps (1) and (2) can be shortened by increasing the rate of water removal by, for example, raising the heating temperature or reducing the inner pressure. It follows that the time and the length of the zone for conducting the step (3) increase.

For example, when polystyrene resins as resins (A) and (B) are treated under atmospheric pressure, the temperature of the heating jacket can be set at 120 to 300° C., preferably 160 to 250° C., and the retention time from the feed opening 4 to the discharge end 5 can be set usually at 1 to 60 minutes, preferably at 5 to 30 minutes, while somewhat varying according to the kneading capacity of the apparatus and other factors.

With an apparatus having a vent hole 7 for discharging water as in the above-described apparatus, an increase in open area of the vent hole 7 for water discharge leads to an increase in efficiency of water removal from the resin mixture having a high water content. That is, it is preferable for attaining high efficiency of the step (2) that the sum of the open area of the feed opening 4 and that of the vent hole 7, which are provided on the upper part of the barrel, ranges from 15 to 100% of the product of the length and the width of the barrel (corresponding to L and D, respectively, shown in FIG. 1). The sum of the open areas being 100%, the upper part of the barrel of the twin-screw continuous mixer is open over the whole length, which is one of preferred embodiments. In this case, the jacket is not provided on the upper part of the barrel. The jacket is provided only on the lower part, or it is replaced with a heating medium which is to be circulated within the revolving shafts or paddles.

In the present invention, resin (A) is substantially solventless. The terminology "substantially solventless" as used for resin (A) means that the total content of water and an organic solvent is not more than 10% by weight, preferably not more than 5% by weight, particularly preferably not more than 1% by weight.

On the other hand, the terminology "substantially solventless" used for the resin composition as obtained by the process of the present invention means that the total content of water and an organic solvent of the resin composition is not more than 5% by weight, preferably not more than 3% by weight, particularly preferably not more than 1% by weight.

Resin (A) subjected to the step (1) is not particularly limited in its form or state and can be fed in any of a flaky form, a powdered form, a granulated form, a block form, or a molten state.

Resin (A) is preferably a polymer obtained by bulk polymerization. It is preferable to feed resin (A) as obtained by bulk polymerization while in a high temperature before being cooled. In this case, the energy efficiency of the apparatus increases, and the mixing is easier because the resin has a lowered viscosity due to the high temperature.

Resin (A), which is used as a low-molecular weight component of a binder resin for a toner, preferably has a molecular weight of 1,500 to 30,000, particularly 2,000 to 20,000, in terms of peak molecular weight at which the proportion of molecules is the highest in the gel-permeation chromatogram (hereinafter referred to as a peak molecular weight Mp).

If the peak molecular weight Mp is less than 1,500, the resulting toner is, while satisfactory in fixing properties, apt to agglomerate, resulting in reduction of a developer life, deterioration of storage stability, and caking when stored in high temperatures. If the Mp exceeds 30,000, the toner is prevented from getting spent (the degradation of carrier) or excessively finer but exhibits insufficient fixing properties in low temperatures, i.e., the toner has a raised lower limit of fixing temperature and the toner tends to cause cold offset.

Resin (A) used as a low-molecular weight component preferably has a weight average molecular weight Mw of 1,000 to 50,000, particularly 1,000 to 40,000, especially 1,000 to 30,000.

Resin (A) preferably has a viscosity of 1 to 10,000 poise, particularly 10 to 1,000 poise, at 150° C.

Resin (A) preferably has a weight average molecular weight (Mw) to number average molecular weight (Mn) ratio, Mw/Mn, of less than 4.

Any kind of resins can serve as resin (A) for use as a low-molecular weight component of a binder resin for a toner with no particular limitation as long as it is applicable as a binder resin for a toner. Examples of useful resins include acrylic resins, styrene resins, epoxy resins, and polyester resins. From the viewpoint of ease of obtaining performance properties as a toner, styrene resins and acrylic resins are preferred, with styrene resins being still preferred.

The styrene resins are homopolymers of a styrene monomer or copolymers mainly comprising a styrene monomer. Suitable styrene monomers include styrene, o-methylstyrene, m-methylstyrene, p-methylstyrene, α-methylstyrene, p-ethylstyrene, 2,4-dimethylstyrene, p-n-butylstyrene, p-t-butylstyrene, p-n-hexylstyrene, p-n-octylstyrene, p-n-nonylstyrene, p-n-decylstyrene, p-n-dodecylstyrene, p-methoxystyrene, p-phenylstyrene, p-chlorostyrene, and 3,4-dichlorostyrene. Styrene is the most suitable of them.

Comonomers to be used in the styrene copolymers are not particularly limited as long as they are copolymerizable with the above-described styrene monomers. Acrylic monomers are preferred. Examples of suitable acrylic monomers are methyl acrylate, ethyl acrylate, n-butyl acrylate, isobutyl acrylate, ethylhexyl acrylate, methyl methacrylate, ethyl methacrylate, n-butyl methacrylate, isobutyl methacrylate, lauryl methacrylate, and stearyl methacrylate. n-Butyl acrylate, ethylhexyl acrylate, n-butyl methacrylate, and lauryl methacrylate are particularly preferred.

The copolymer obtained by bulk polymerizing the acrylic monomer and the styrene monomer under the conditions described below preferably has a glass transition temperature of from 40 to 80° C., particularly of from 50 to 70° C., and preferably comprises 80 to 100% by weight of a repeating unit derived from the styrene monomer.

Resin (A) for use as a low-molecular weight component of a binder resin for a toner can easily be obtained by bulk polymerization. While not limiting, the bulk polymerization is preferably carried out in the presence of a catalyst.

The bulk polymerization is carried out by dissolving in the monomer a catalyst capable of being dissolved therein and heating the system which is substantially free of a solvent, a dispersant, an emulsifying agent, etc. The bulk polymerization can be conducted either in a batch system or in a continuous system. From the standpoint of efficiency, it is preferable to feed a monomer having dissolved therein a catalyst to a continuous polymerizer.

The polymerization temperature for bulk polymerization is preferably 130 to 250° C., still preferably 170 to 250° C., particularly preferably 190 to 230° C.

At temperatures below 130° C., the reaction is slow, and the peak molecular weight Mp of the resulting polymer becomes higher than desired. At temperatures above 250° C., the polymerization reaction is accompanied by depolymerization of the polymer produced, resulting in an increased proportion of oligomers having a molecular weight of 500 or smaller. A toner prepared by using such a resin tends to have poor preservability and is ready to become spent (the degradation of carrier) or be made finer.

Any conventional oil-soluble radical polymerization initiator can be used as a catalyst for bulk polymerization. Suitable initiators include benzoyl peroxide, t-butyl hydroperoxide, di-t-butyl peroxide, cumene hydroperoxide, t-hexyl hydroperoxide, p-menthane hydroperoxide, and azobisisobutyronitrile.

In particular, initiators suitable for high-temperature polymerization at 170° C. or higher include t-butyl hydroperoxide and di-t-butyl peroxide.

The radical polymerization initiator is preferably used in an amount of 0 to 5% by weight, particularly 0.03 to 3% by weight, especially 0.05 to 1% by weight, based on the total monomer(s).

In preparing a styrene-based low-molecular weight polymer, the polymerization temperature and time are preferably selected so as to give a conversion of at least 90%, preferably at least 95%, still preferably at least 97%. If desired, the residual monomer(s) can be recovered by means of a molecular distillation still, etc.

The thus obtained bulk polymerization product having a low molecular weight is advantageous for use as a binder resin component for a toner particularly in that the resulting toner exhibits improved charge retention and has little odor.

The emulsion of resin (B) for use in the present invention is not particularly limited as long as it has dispersed therein resin (B) in an emulsified state, and any type of resin emulsions can be used. In particular, a resin emulsion as prepared by emulsion polymerization is preferred for its dispersion stability.

Any kind of resins can be used as resin (B) as far as it is usable in the form of an emulsion. Examples enumerated as resin (A) also apply to resin (B).

The dispersed particles of resin (B) in the emulsion preferably have a particle size of 0.03 to 1 $\mu$m for their excellent dispersibility with resin (A). A resin (B) emulsion as obtained by emulsion polymerization and having the above-specified particle size is particularly preferred.

Taking into consideration the stability of resin (B) emulsion on being mixed with resin (A), resin (B) preferably has a weight average molecular weight of more than 50,000, particularly more than 100,000, especially more than 300,000. Resin (B) may have as high as such a degree of molecular weight that it has a gel fraction insoluble in a solvent used in gel-permeation chromatography (GPC), e.g., tetrahydrofuran.

In the present invention, both resin (A) and the emulsion of resin (B) can be used either individually or as a mixture of two or more thereof.

The total water content of resin (A) and the emulsion of resin (B) is preferably not more than 60% by weight, particularly not more than 50% by weight, based on the total weight of resin (A) and the emulsion of resin (B).

Resin (B) in the emulsion is used to serve as a high-molecular weight component of a binder resin for a toner in combination with resin (A) used as a low-molecular weight component. Therefore, it is preferable for resin (B) to have a higher weight-average molecular weight than resin (A).

Resin (B) used as a high-molecular weight component of a binder resin for a toner preferably has a peak molecular weight Mp (a peak molecular weight obtained by GPC) of 300,000 to 3,000,000, particularly 500,000 to 2,000,000, especially 600,000 to 1,000,000.

If the Mp of resin (B) is lower than the above lower limit, the resulting toner exhibits satisfactory fixing properties but is apt to cause hot offset, making the fixing temperature latitude narrower.

Resin (B) used as a high-molecular weight component preferably has a weight average molecular weight Mw of more than 100,000, particularly more than 200,000, especially more than 300,000.

The kind of resin (B) in the emulsion can be selected from those enumerated as the low-molecular weight component of a binder resin for a toner. Polystyrene resins are particularly preferred.

Where resin (B) is used as a high-molecular weight component of a binder resin for a toner, the dispersed particle size of the resin (B) emulsion is preferably in the range of from 0.03 to 1 $\mu$m.

If the particle size of resin (B) in the resin emulsion exceeds 1 $\mu$m, resin (B) is hardly dispersed with resin (A), the low-molecular weight polymer. As a result, the resulting toner has poor fixing properties and tends to cause hot offset, making the fixing temperature latitude narrower.

Dispersed particle sizes of smaller than 0.03 $\mu$m are not preferred because making the particle size less than 0.03 $\mu$m requires a large amount of the emulsifying agent to be used in emulsion polymerization, which lowers the electrical resistance of the resulting toner.

Degree of mutual dispersion of resin (A) and resin (B) is related to fixing properties and durability of a toner. That is, a toner in which these resins are dispersed non-uniformly simultaneously causes hot offset and cold offset at the time of fixing. Further, such a toner easily gets spent (the degradation of carrier) and made finer, and a developer using the toner has a short life.

Where resin (A) used as a low-molecular component and resin (B) in the emulsion used as a high-molecular component are combined to provide a binder resin for a toner, resin (A) is preferably used in a proportion of 50 to 80 parts by weight, particularly 55 to 75 parts by weight, and resin (B) 20 to 50 parts by weight, particularly 25 to 45 parts by weight, per 100 parts by weight of the total amount of resin (A) and resin (B). If the proportion of resin (A) is less than the above lower limit (i.e., if the proportion of resin (B) is more than the above upper limit), the resulting toner, while satisfactory in anti-offset properties, exhibits poor fixing properties in a low temperature region, raising the lower limit of a fixing temperature. If the proportion of resin (A) is more than the above upper limit (i.e., if the proportion of resin (B) is less than the above lower limit), the fixing properties are satisfactory, but the toner is apt to cause hot offset, making the fixing temperature latitude narrower.

Emulsion polymerization for preparing an emulsion of resin (B) is carried out by mixing a monomer(s), a water-soluble radical polymerization initiator, an emulsifying agent, and water as a polymerization medium and heating the mixture to a polymerization temperature.

Useful monomers include those described above as examples of monomers providing resin (A) used as a low-molecular weight component and, in addition, polyfunctional crosslinking monomers having at least two polymerizable double bonds, such as aromatic divinyl compounds (e.g., divinylbenzene and divinylnaphthalene), diethylenic carboxylic acid esters (e.g., ethylene glycol dimethacrylate, tetraethylene glycol dimethacrylate, 1,3-butanediol dimethacrylate, 1,6-hexanediol diacrylate, and allyl methacrylate), N,N'-divinylaniline, divinyl ether, and divinyl sulfide. Preferred of them are divinylbenzene, ethylene glycol dimethacrylate, and 1,6-hexanediol diacrylate.

The proportion of the unit derived from the crosslinking monomer in resin (B) is preferably up to 2% by weight, still preferably 0.01 to 1% by weight, particularly preferably 0.02 to 0.8% by weight.

The radical polymerization initiator which can be used in the emulsion polymerization is selected arbitrarily from conventional water-soluble radical polymerization initiators.

Suitable radical polymerization initiators include hydrogen peroxide, specific alkyl hydroperoxides, dialkyl peroxides, persulfates, peresters, percarbonates, ketone peroxides, and azo type initiators.

Specific examples of suitable radical polymerization initiators include hydrogen peroxide, t-butyl hydroperoxide, ammonium persulfate, potassium persulfate, sodium persulfate, t-amyl hydroperoxide, methyl ethyl ketone peroxide, 2,2'-azobis(2-amidinopropane), and 2,2'-azobis(4-cyanovaleric acid).

The radical polymerization initiator is preferably used in an amount of 0.03 to 1% by weight, particularly 0.05 to 0.8% by weight, especially 0.1 to 0.5% by weight, based on the total monomer.

A water-soluble redox initiator, a combination of a water-soluble peroxide and a water-soluble reducing agent, can also be used. The peroxide of the water-soluble redox initiator includes those enumerated above. The reducing agent includes sodium bisulfite, sodium pyrosulfite, sodium sulfite, a hypophosphite, ascorbic acid, and formaldehyde-sodium sulfoxylate.

The redox initiator is used in an amount of 0.03 to 1% by weight based on the total monomer.

If desired, a trace amount of a transition metal (e.g., ferrous sulfate, Mohr's salt, copper sulfate, etc.) may be used in combination of the redox initiator.

The emulsifying agent to be used in the emulsion polymerization can be any of anionic ones, nonionic ones, cationic ones, and amphoteric ones. These emulsifying agents can be used either individually or as a combination thereof.

The nonionic emulsifying agents include polyoxyethylene alkyl ethers, e.g., polyoxyethylene lauryl ether and polyoxyethylene stearyl ether; polyoxyethylene alkyl phenyl ethers, e.g., polyoxyethylene octyl phenyl ether and polyoxyethylene nonyl phenyl ether; sorbitan higher fatty acid esters, e.g., sorbitan monolaurate, sorbitan monostearate, and sorbitan trioleate; polyoxyethylene sorbitan higher fatty acid esters, e.g., polyoxyethylene sorbitan monolaurate; polyoxyethylene higher fatty acid esters, e.g., polyoxyethylene monolaurate and polyoxyethylene monostearate; glycerol higher fatty acid esters, e.g., glycerol monooleate and glycerol monostearate; and polyoxyethylene-polyoxypropylene block copolymers.

The anionic emulsifying agents include higher fatty acid salts, e.g., sodium oleate; alkylarylsulfonates, e.g., sodium dodecylbenzenesulfonate; alkylsulfuric esters, e.g., sodium laurylsulfate; polyoxyethylene alkyl ether sulfuric ester salts, e.g., sodium polyoxyethylene lauryl ether sulfate; polyoxyethylene alkyl aryl ether sulfuric ester salts, e.g., sodium polyoxyethylene nonyl phenyl ether sulfate; and alkylsulfosuccinic acid ester and derivatives thereof, e.g., sodium monooctylsulfosuccinate, sodium dioctylsulfosuccinate, and sodium polyoxyethylene laurylsulfosuccinate.

The amphoteric emulsifying agents include alkyl betaines, e g., lauryl betaine.

Fluorine-containing emulsifying agents derived from the above emulsifying agents by displacing at least a part of the hydrogen atoms of the alkyl moiety thereof with fluorine are also useful.

The cationic emulsifying agents include octadecyltrimethylammonium chloride, dodecyltrimethylammonium chloride, hexadecyltrimethylammonium chloride, dioctadecylsilmethylammonium chloride, didodecyldimethylammonium chloride, dodecylbenzyldimethylammonium chloride, tetradecylbenzyldimethylammonium chloride, octadecylbenzyldimethylammonium chloride, tetradecyltrimethylammonium chloride, dihexadecyldimethylammonium chloride, dioctadecyldimethylammonium chloride, hexadecylbenzyldimethylammonium chloride, palmityltrimethylammonium chloride, oleyltrimethylammonium chloride, dipalmitylbenzyltrimethylammonium chloride, and dioleylbenzyltrimethylammonium chloride.

Cationic emulsifying agents prepared from natural vegetable oil, such as coconut oil, palm oil, safflower oil, cotton seed oil, rape seed oil, and linseed oil, can also be used. Such cationic emulsifying agents include coconut oil alkylbenzyldimethylammonium chloride and coconut oil alkyltrimethylammonium chloride. Amine acetates and hydrochlorides as a cationic emulsifying agent include dodecylamine acetate, tetradodecylamine acetate, octadecylamine acetate, dodecylamine hydrochloride, tetradecylamine hydrochloride, octadecylamine hydrochloride, and hardened beef tallow amine acetate.

Reactive emulsifying agents having polymerizable double bond in the molecule thereof are also useful. Examples of such reactive emulsifying agents include those represented by the following formulae (1) and (2):

wherein two $R^1$'s each independently represent a hydrogen atom or a methyl group; $R^2$ represents an alkyl, alkenyl, aryl or aralkyl group having 6 to 18 carbon atoms; X represents a single bond or a methylene group; Z represents a hydrogen atom or $SO_3M$ (wherein M represents an alkali metal, an ammonium group or an organic ammonium group); and m represents a natural number of from 1 to 50.

Of the reactive emulsifying agents represented by formula (1), anionic ones in which Z is $SO_3M$ include Adekaria Soap SE-10N (produced by Asahi Denka Kogyo K. K.), and nonionic ones in which Z is hydrogen include Adekaria Soap NE-10, Adekaria Soap NE-20, and Adekaria Soap NE-30 (all produced by Asahi Denka Kogyo K. K.).

Of the reactive emulsifying agents represented by formula (2), anionic ones in which Z is $SO_3M$ include Aquaron HS-10 and Aquaron HS-20 (both produced by Dai-ichi Kogyo Seiyaku Co., Ltd.), and nonionic ones in which Z is hydrogen include Aquaron RN-10, Aquaron RN-20, Aquaron RN-30, and Aquaron RN-50 (all produced by Dai-ichi Kogyo Seiyaku Co., Ltd.).

Other anionic reactive emulsifying agents include alkylsulfosuccinic acid alkenyl ether salts, e.g., Latemul S-120, Latemul S-120A, Latemul S-180, and Latemul S-180A (all produced by Kao Corp.); alkylsulfosuccinic acid alkenyl ester salts, e.g., Eleminol JS-2 (produced by Sanyo Chemical Industries, Ltd.); methylenebispolyoxyethylene alkylphenyl alkenyl ether sulfuric ester salts, e.g., Antox MS-60 (produced by Nippon Nyukazai Co., Ltd.); alkylalkenylsuccinic ester salts, e.g., Latemul ASK (produced by Kao Corp.); polyoxyalkylene (meth)acrylate sulfuric ester salts, e.g., Eleminol RS-30 (produced by Sanyo Chemical Industries, Ltd.); polyoxyalkylene alkyl ether fatty acid unsaturated dicarboxylic ester salts, e.g., RA-1120 and RA-2614 (both produced by Nippon Nyukazai Co., Ltd.); (meth)acrylic acid sulfoalkyl ester salts, e.g., Antox MS-2N (produced by Nippon Nyukazai Co., Ltd.); phthalic acid dihydroxyalkyl (meth)acrylate sulfuric ester salts; and mono- or di(glycerol-1-alkylphenyl-3-allyl-2-polyoxyalkylene ether) phosphoric ester salts, e.g., H-3330PL produced by Dai-ichi Kogyo Seiyaku Co., Ltd.).

Other nonionic reactive emulsifying agents include polyoxyalkylene alkyl phenyl ether (meth)acrylates, e.g., RMA-564 and RMA-568 (produced by Nippon Nyukazai Co., Ltd.); and polyoxyalkylene alkyl phenyl ether (meth) acrylates, e.g.,RMA-1114 (produced by Nippon Nyukazai Co., Ltd.).

While water is used as a medium of emulsion polymerization, a water-soluble solvent, such as an alcohol, may be used in combination.

In general, in emulsion polymerization, most of the monomer is converted into a polymer, with an extremely small amount of the monomer remaining unreacted. And yet where the residual monomer concentration is not sufficiently low for some uses, the residual monomer can be reduced by, for example, adding one or more initiators or reducing agents or blowing steam or air after polymerization.

Where an initiator or a reducing agent is added after polymerization, the initiator or reducing agent is added intermittently or continuously in an amount of 0.1 to 2.0 parts by weight, preferably 0.5 to 1.0 part by weight, per 100 parts by weight of the polymerizable residual monomer over a period of 5 minutes to 5 hours, preferably 30 minutes to 4 hours, still preferably 1 to 3 hours.

If necessary, the emulsion after completion of emulsion polymerization can have its pH adjusted by addition of aqueous ammonia, an aqueous amine solution, an aqueous alkali hydroxide solution, etc.

The emulsion to be used usually has a solids content of 10 to 70% by weight, preferably 20 to 60% by weight, still preferably 30 to 50% by weight.

It is usually desirable for the emulsion to have a viscosity of not more than 10,000 cps (measured with a BH type rotational viscometer at 25° C. and 20 rpm; hereinafter the same) and a pH of 2 to 10.

In carrying out the steps (1) and (2) for production of a binder resin for a toner, a plasticizer, a filler, a colorant, an ultraviolet absorber, and the like may be present in the system in addition to resin (A) and the emulsion of resin (B).

In carrying out the step (1), substantially solventless resin (A) and the emulsion of resin (B) can be compounded with appropriate additives as described below to provide a toner directly.

The binder resin as obtained in the form of pellets or flakes by the process of the present invention is compounded with various additives, such as a colorant, and, if desired, a charge control agent, a magnetic substance, and a parting agent, and uniformly melt-kneaded. The molten mixture is cooled, if desired crushed, finely ground in a jet mill, etc., and classified to obtain a toner for electrostatic latent image development having a desired particle size.

The colorant is preferably used in an amount of 1 to 30 parts by weight, particularly 3 to 20 parts by weight, per 100 parts by weight of the binder resin.

The colorant includes inorganic pigments, organic pigments, and synthetic dyes. Inorganic pigments or organic pigments are preferably used. One or more than one pigments and/or one or more dyes may be used in combination.

Suitable inorganic pigments include metal powder pigments, metal oxide pigments, carbon pigments, sulfide pigments, chromate pigments, and ferrocyanide pigments.

Examples of the metal powder pigments are zinc powder, iron powder, and copper powder.

Examples of the metal oxide pigments are magnetite, ferrite, red iron oxide, titanium oxide, zinc oxide, silica, chromium oxide, ultramarine, cobalt blue, cerulean blue, mineral violet, and trilead tetroxide.

Examples of the carbon pigments are carbon black, thermatomic carbon, and furnace black.

Examples of the sulfide pigments include zinc sulfide, cadmium red, selenium red, mercury sulfide, and cadmium yellow.

Examples of the chromium pigments include molybdate red, barium yellow, strontium yellow, and chromium yellow. The ferrocyanide pigments include Milori blue.

The organic pigments include azo pigments, acid dye lakes, basic dye lakes, mordant dye lakes, phthalocyanine pigments, quinacridone pigments, and dioxane pigments.

Examples of the azo pigments are Benzidine Yellow, Benzidine Orange, Permanent Red 4R, Pyrazolone Red, Lithol Red, Brilliant Scarlet G, and BON Maroon Light.

The acid dye lakes and the basic dye lakes include those obtained by precipitating dyes, such as Orange II, Acid Orange R, Eosine, Quinoline Yellow, Tartrazine Yellow, Acid Green, Peacock Blue, and Alkali Blue, with a precipitating agent; and those obtained by precipitating dyes, such as Rhodamine, Magenta, Malachite Green, Methyl Violet, and Victorian Blue, with tannic acid, potassium antimonyl tartrate, phosphotungstic acid, phosphomolybdic acid, phosphotungstomolybdic acid, etc.

Examples of the mordant dye lakes include metal salts of hydroxyanthraquinone dyes and Alizarin Madder Lake.

Examples of the phthalocyanine pigments are Phthalocyanine Blue and sulfonated copper phthalocyanine.

Examples of the quinacridone pigments and dioxane pigments are Quinacridone Red, Quinacridone Violet, and Carbazole Dioxane Violet.

The synthetic dyes include acridine dyes, Aniline Black, anthraquinone dyes, azine dyes, azo dyes, azomethine dyes, benzo and naphthoquinone dyes, indigo dyes, indophenol, indoaniline, indamine, leuco vat ester dyes, naphtholimide dyes, Nigrosine, Induline, nitro and nitroso dyes, oxazine and dioxazine dyes, oxidation dyes, phthalocyanine dyes, polymethine dyes, quinophthalone dyes, sulfur dyes, tri- and diallylmethane dyes, thiazine dyes, and xanthene dyes. Preferred of these synthetic dyes are Aniline Black, nigrosine dyes, and azo dyes. Still preferred are azo dyes having a salicylic acid, naphthoic acid or 8-oxyquinoline residual group capable of forming a metal complex with chromium, copper, cobalt, iron, aluminum, etc.

The charge control agent includes nigrosine type electron-donating dyes, metal salts of naphthoic acid or higher fatty acids, amine alkoxides, quaternary ammonium salts, alkylamides, chelates, pigments, and fluorine-containing surface active agents for controlling positive chargeability; and electron-accepting organic complexes, chlorinated paraffin, chlorinated polyester, polyester having excess acid radical, and copper phthalocyanine sulfonylamine for controlling negative chargeability.

The thus prepared toner is suitable in a so-called two-component developer comprising a toner and a carrier, such as iron powder or glass beads, which preferably has a resin coat. The toner is also applicable to a one-component developer using no carrier, including a magnetic toner containing magnetic powder and a nonmagnetic toner containing no magnetic powder.

Carriers having a resin coat typically comprise core particles of iron, nickel, ferrite or glass beads coated with an insulating resin. Typical insulating resin materials include fluorine-containing resins, silicone resins, acrylic resins, styrene-acrylate copolymer resins, polyester resins, and polybutadiene resins.

When the toner obtained by the process of the present invention is used in a two-component developer containing a resin-coated carrier, the resulting developer exhibits controlled triboelectric characteristics between the carrier and the toner so as to markedly reduce developer fatigue due to contamination of the carrier particles by the toner particles and is particularly suited for use in high-speed electrophotographic copying machines for its excellent durability and long life.

The binder resin obtained by the process of the present invention can be blended with other auxiliary binder resins, such as styrene resins and polyester resins. In this case, the proportion of the auxiliary binder resin is preferably not more than 30% by weight based on the total binder resin.

The present invention will now be illustrated in greater detail with reference to Examples and Comparative Examples. Unless otherwise noted, all the percents and arts are given by weight.

Methods of testing carried out in Examples are as follows.

Measurement of Molecular Weight:

A peak molecular weight Mp of a molecular weight distribution was measured with a gel-permeation chromatograph (GPC) equipped with three columns (GMH, produced by Tosoh Corp.). A resin sample was dissolved in tetrahydrofuran (THF) in a concentration of 0.2% and passed through the columns at 20° C. at a flow rate of 1 ml/min. In the molecular weight measurement, measuring conditions were selected so that measurements on several monodispersed polystyrene standard samples may form a straight calibration line with the logarithm plotted as an ordinate and the count number as an abscissa.

Measurement of Residual Monomer:

A residual monomer content of a polymer was measured with a gas chromatograph (GC) equipped with a column 25% Thermon 1,000. A polymer sample was dissolved in chloroform in a concentration of 2.5% and filtered. A 3 $\mu$l portion of the extract was passed through the column.

The monomer concentration of the sample was calculated from the calibration curve of each monomer.

EXAMPLE 1

Preparation of Substantially Solventless Resin (A):

To an autoclave equipped with a stirrer, a heating means, and a cooling means and set at 210° C. was added continuously a uniform monomer mixture consisting of 100 parts of styrene (St) and 0.5 part of di-t-butyl peroxide over 30 minutes and kept at 210° C. for 30 minutes to obtain a polystyrene resin. Unreacted styrene was recovered from the resulting polystyrene resin by means of a molecular distillation or vacuum distillation still to obtain a polystyrene resin having a residual styrene content of 500 ppm.

The resulting polystyrene resin had a peak molecular weight Mp of 4,500, a weight average molecular weight Mw of 5,100, and a glass transition temperature of 68° C.

Preparation of Emulsion of Resin (B):

In a container equipped with a stirrer and a dropping pump were put 27 parts of deionized water and 1 part of an anionic reactive emulsifying agent Aquaron HS-10 (polyoxyethylene (n=ca. 10) nonylpropenyl phenyl ether sulfuric ester sodium salt; effective component: ca. 100%; produced by Asahi Denka Kogyo K.K.). After dissolving by stirring, a monomer mixture consisting of 77 parts of styrene (St), 23 parts of butyl acrylate (BA), and 0.05 part of divinylbenzene was added thereto dropwise while stirring to prepare a monomer emulsion.

In a pressure reactor equipped with a stirrer, a pressure gauge, a thermometer, and a dropping pump was charged 120 parts of deionized water. After displacing the atmosphere with nitrogen, the inner temperature was elevated to 80° C., at which a 10% portion of the above-prepared monomer emulsion was added thereto. Further, 1 part of a 2% potassium persulfate aqueous solution was added to carry out initial polymerization at 80° C. After completion of the initial polymerization, the temperature was raised to 85° C., at which the rest of the monomer emulsion and 4 parts of a 2% potassium persulfate aqueous solution were added over a 3 hour period. The reaction system was maintained at that temperature for 2 hours to obtain a styrene-butyl acrylate-divinylbenzene copolymer resin emulsion having a solids content of 40% and a particle size of 0.2 $\mu$m.

The resulting resin emulsion exhibited a high rate of conversion and stable progress of the polymerization.

The resin emulsion was subjected to centrifugal separation to separate the resin, which was found, by analysis, to have a weight average molecular weight (Mw) of 1,000,000 and a peak molecular weight Mp of 750,000.

Preparation of Binder Resin for Toner:

A hundred parts of the above-prepared substantially solventless resin (A) melted at 210° C. and 135 parts of the above-prepared resin emulsion were put in the continuous mixer shown in FIG. 1 (KRC Kneader, manufactured by Kurimoto, Ltd.), and a step of mixing with stirring, a step of heating to evaporate water, and a step of kneading were carried out in a continuous manner at a jacket temperature of 200° C. to obtain a binder resin for a toner having a water content of not more than 0.1% in which resin (A) and resin (B) were uniformly dispersed. The resulting binder resin had a residual monomer content of 100 ppm.

Preparation of Toner:

A hundred parts of the binder resin, 6 parts of carbon black (Carbon Black MA-100, produced by Mitsubishi Chemical Co., Ltd.), 2 parts of polypropylene wax (Viscol 550P, produced by Sanyo Chemical Industries, Ltd.), and 2 parts of a nigrosine dye (Bontron N-01, produced by Orient Kagaku K. K.) were mixed and ground in a ball mill, and the mixture was thoroughly kneaded by means of hot rolls set at 140° C. for 30 minutes.

After cooling, the mixture was crushed in a hammer mill and then finely ground in a jet mill. The grinds were classified in an air classifier to obtain particles of 5 to 20 $\mu$m. The particles were mixed with 0.2 part of hydrophobic silica (R-972, produced by Nippon Aerosil K. K.) to obtain a toner having an average particle size of 10 $\mu$m.

The resulting toner was mixed with a silicone resin-coated carrier to prepare a developer, which was subjected to a copying test on a commercially available copier. Fixing of a toner image was possible at or above 145° C. No contamination of the fusing roller with the toner (offset) occurred even at a fixing temperature of 230° C. After producing 100,000 copies, contamination of the carrier particles with the toner was not observed, and clear copies free from background stains or fog as those obtained in the initial stage were obtained.

EXAMPLE 2

Preparation of Substantially Solventless Resin (A):

Polymerization was carried out in the same manner as in Example 1, except for using a uniform monomer mixture consisting of 87 parts of styrene (St), 13 parts of butyl acrylate (BA), and 0.1 part of di-t-butyl peroxide, conducting the reaction at 200° C., and adding the monomer mixture over a 30 minute period. The resulting styrene-butyl acrylate copolymer resin was subjected to molecular distillation or vacuum distillation to remove unreacted styrene and butyl acrylate. The styrene-butyl acrylate copolymer resin had a peak molecular weight Mp of 10,000, a weight average molecular weight Mw of 13,000, a residual monomer content of 600 ppm, and a glass transition temperature of 65° C.

Preparation of Emulsion of Resin (B):

Polymerization was carried out in the same manner as in Example 1, except for using a monomer mixture consisting of 70 parts of styrene, 20 parts of butyl acrylate, 10 parts of butyl methacrylate (BMA), and 0.1 part of 1,6-hexanediol diacrylate (1,6-HDDA), and using 1.2 part of Neogen R (produced by Kao Corp.) as an emulsifying agent, to obtain an emulsion of a styrene-butyl acrylate-butyl methacrylate-1,6-hexanediol diacrylate copolymer resin having a solids content of 40%, a weight average molecular weight Mw of 850,000, a peak molecular weight Mp of 650,000, and a particle size of 0.1 $\mu$m.

Preparation of Binder Resin for Toner:

A hundred parts of the substantially solventless resin (A) melted at 200° C. and 107 parts of the emulsion of resin (B) were treated in the same manner as in Example 1 to obtain a uniform resin mixture.

The resin mixture was found to have a residual monomer content of 80 ppm.

A toner was prepared using the resulting resin mixture and tested in the same manner as in Example 1. As a result, fixing of a toner image was possible at or above 140° C. No contamination of the fusing roller (offset) occurred even at a fixing temperature of 225° C. Even after producing 100,000 copies, clear copies free from background stains or fog as those obtained in the initial stage were obtained.

EXAMPLE 3

Preparation of Binder Resin for Toner:

A hundred parts of the substantially solventless resin (A) prepared in Example 1 and melted at 210° C. and 135 parts of the emulsion of resin (B) prepared in Example 1 were fed to a twin-screw extruder equipped with a vacuum water separator and having two screws, a heating jacket heated at 200° C., and a vacuum pump fixed to the vent hole (TEX, manufactured by The Nippon Steel Works, Ltd.). The steps of mixing with stirring, removing water by evaporation under heat, and kneading were carried out to obtain a binder resin for a toner having a water content of not more than 0.1% in which resin (A) and resin (B) were uniformly dispersed. The resulting binder resin had a residual monomer content of 200 ppm.

A toner was obtained using the resulting resin mixture and tested in the same manner as in Example 1. As a result, fixing of a toner image was possible at or above 150° C. No contamination of the fusing roller by offset occurred even at a fixing temperature of 220° C. Even after 50,000 copies were produced, clear copies free from background stains or fog as those obtained in the initial stage were obtained.

EXAMPLE 4

The substantially solventless resin (A) obtained in Example 1 was crushed to a diameter of about 1 mm in a hammer mill. A hundred parts of the coarse particles of resin (A) were mixed while stirring with 135 parts of the emulsion of resin (B) prepared in Example 1 at room temperature to obtain a uniform slurry.

The slurry was treated (mixing, water removal, and kneading) in the same manner as in Example 1 (jacket temperature: 200° C.) to obtain a binder resin for a toner.

The resulting binder resin had a residual monomer content of 210 ppm.

A toner was prepared using the binder resin and tested in the same manner as in Example 1. As a result, fixing of a toner image was possible at or above 150° C. Offset was not observed up to a fixing temperature of 215° C. After producing 50,000 copies, clear copies free from background stains or fog as those obtained in the initial stage were obtained.

COMPARATIVE EXAMPLE 1

The emulsion of resin (B) prepared in Example 1 was dried in a drier at 105° C. and crushed to a particle size of about 3 mm in a hammer mill. The resulting coarse particles (54 parts) of resin (B) and 100 parts of resin (A) prepared in Example 1 were mixed and kneaded in the same continuous mixer as used in Example 1 in the same manner as in Example 1 to obtain a resin composition.

A toner was prepared and tested in the same manner as in Example 1, except for using the above resin mixture as a binder resin. As a result, considerable offset (contamination of the fusing roller with the toner) was observed, and the resulting copies suffered from considerable fog.

COMPARATIVE EXAMPLE 2

Preparation of Suspension Polymer and Separation of Resin (B):

In a container equipped with a stirrer and a dropping pump were charged 200 parts of deionized water and 1 part of polyvinyl alcohol (PVA117, produced by Kuraray Co., Ltd.). After dissolving by stirring, a monomer mixture consisting of 77 parts of styrene, 23 parts of butyl acrylate, and 0.15 part of di-t-butyl peroxyhexahydroterephthalate (Kaya Ester HTP, produced by Nippon Kayaku Co., Ltd.) was added thereto. The monomer mixture was suspension polymerized at 90° C. for 2 hours while stirring to obtain a suspension polymer.

The styrene-butyl acrylate copolymer resin was separated from the suspension and dried to obtain a bead copolymer resin.

The resulting copolymer resin had an average particle size of 180 $\mu$m, a weight average molecular weight Mw of 650,000, and a peak molecular weight Mp of 500,000.

The copolymer resin (54 parts) and 100 parts of the resin (A) prepared in Example 1 were treated in the same manner as in Example 1 to obtain a resin composition.

The resin composition had a residual monomer content of 980 ppm.

A toner was prepared using the resulting resin composition and tested in the same manner as in Example 1. As a result, considerable offset (contamination of the fusing roller with the toner) was observed, and the resulting copies suffered from considerable fog.

In Table 1 below are shown the composition and physical properties of the resins prepared in Examples 1 to 4 and Comparative Examples 1 and 2. In Table 2 below are shown the content of the binder resins for a toner prepared in these Examples and the results of the performance test on the resulting toners.

Abbreviations and symbols used in Tables 1 and 2 have the following meanings:

(1) Monomers
 St: Styrene
 BA: Butyl acrylate
 BMA: Butyl methacrylate
 DVB: Divinylbenzene
 1,6-HDDA: 1,6-Hexanediol diacrylate (2) Evaluation of Fog by Toner
 A: No fog occurred after obtaining 100,000 copies.
 B: No fog occurred after obtaining 50,000 copies. Slight fog occurred after obtaining 100,000 copies.
 C: Fog occurred from the initial stage of copying.

TABLE 1

|  |  | Resin (A) |  |  |  |  |  |  |  |  | Resin (B) |  |  |  |
|---|---|---|---|---|---|---|---|---|---|---|---|---|---|---|
|  |  | Com-position*1 | Physical Properties |  |  | Composition*1 |  |  |  |  | Physical Properties |  |  |  |
|  |  |  |  |  | Tg |  |  |  |  | 1.6- |  |  | Particle Size | State |
|  |  | St | BA | Mw | Mp | (°C.) | St | BA | BMA | DVB | HDDA | Mw | Mp | (μm) | when mixed |
| Example | 1 | 100 | — | 5,100 | 4,500 | 68 | 77 | 23 | — | 0.05 | — | 1,000,000 | 750,000 | 0.2 | Emulsion |
|  | 2 | 87 | 13 | 13,000 | 10,000 | 65 | 70 | 20 | 10 | — | 0.10 | 850,000 | 650,000 | 0.1 | Emulsion |
|  | 3 |  |  |  |  | The same as in Example 1 |  |  |  |  |  |  |  |  |  |
|  | 4 |  |  |  |  | " |  |  |  |  |  |  |  |  |  |
| Comparative Example | 1 |  |  |  |  | " |  |  |  |  |  |  |  | 300 | Crushed coarse particles |
|  | 2 |  |  |  |  | " |  |  |  |  |  |  |  | 180 | Dried beads |

*1parts by weight.

TABLE 2

| | | Binder Resin for Toner | | | | |
|---|---|---|---|---|---|---|
| | | Content | | | Results of Copying Test | |
| | | Resin (A) (parts by weight) | Resin (B) (parts by weight) | Residual Monomer Content (ppm) | Minimum Fixing Temp. (°C.) | Offset Temp. (°C.) | Fog |
| Example | 1 | 100 | 135*1 | 100 | 145 | >230 | A |
| | 2 | 100 | 107*1 | 80 | 140 | >225 | A |
| | 3 | 100 | 135*1 | 200 | 150 | >220 | A |
| | 4 | 100 | 135*1 | 210 | 150 | 215 | B |
| Comparative Example | 1 | 100 | 54*2 | 930 | 150 | 175 | C |
| | 2 | 100 | 54*3 | 980 | 145 | 170 | C |

*1Emulsion
*2Dried and crushed particles of an emulsion
*3Dried particles of a suspension polymer

What is claimed is:

1. A process for producing a binder resin for a toner comprising the steps of:
   (1) stirring together until uniformly dispersed, a mixture of a first component of the binder resin and second component of the binder resin, the first component of the binder resin being a melted and substantially solventless styrene resin (A) and the second component of the binder resin being an emulsion of a styrene resin (B) different from the first styrene resin (A), the styrene resin (A) having a weight average molecular weight of 1,000 to 50,000 and being a polymer prepared by bulk polymerization at a temperature of not lower than 100° C. and the styrene resin (B) having a weight average molecular weight of more than 50,000 and being a polymer prepared by emulsion polymerization;
   (2) evaporating water from the mixture of the two styrene resins during or after step (1); and
   (3) reducing a water content of the evaporated mixture to not more than 1% by weight by kneading the mixture.

2. A process according to claim 1, wherein the step (1) is carried out at or above the glass transition temperature of said resin (A).

3. A process according to claim 1, wherein the steps (1), (2), and (3) are carried out in the same mixing apparatus.

4. A process according to claim 1, wherein the steps (1) and (2) are carried out in a first mixing apparatus, and the step (3) is carried out in a second mixing apparatus.

5. A process according to claim 4, wherein the resin composition obtained after the step (2) has a water content of not more than 10% by weight.

6. A process according to claim 1, wherein said styrene resin as said resin (A) has a peak molecular weight Mp of 1,500 to 30,000 and a weight average molecular weight to number average molecular weight ratio (Mw/Mn) of less than 4.0, as measured by gel-permeation chromatography.

7. A process according to claim 1, wherein said styrene resin as said resin (B) has a peak molecular weight Mp of 300,000 to 3,000,000 as measured by gel-permeation chromatography.

8. A process according to claim 1, wherein the proportions of said resin (A) and said resin (B) in the total amount of said resin (A) and said resin (B) are 50 to 80 parts by weight and 20 to 50 parts by weight, respectively, per 100 parts by weight of the total weight of said resin (A) and said resin (B).

9. A process according to claim 1, carried out in a mixing apparatus, wherein said mixing apparatus is a twin-screw continuous mixer.

10. A process according to claim 9, wherein said twin-screw continuous mixer has a vent hole for discharging steam out of the system.

11. A process according to claim 9, wherein said twin-screw continuous mixer has an opening over the whole length of its zone where to carry out the steps (1) and (2).

* * * * *